May 2, 1961 G. F. D'ALELIO 2,982,457
TUBULAR STRUCTURES
Filed Nov. 28, 1958 3 Sheets-Sheet 1

INVENTOR.
GAETANO F. D'ALELIO
BY Walter J. Moracelli
HIS ATTORNEY

May 2, 1961 G. F. D'ALELIO 2,982,457
TUBULAR STRUCTURES

Filed Nov. 28, 1958 3 Sheets-Sheet 2

INVENTOR.
GAETANO F. D'ALELIO
BY
Walter J. Monarelli
HIS ATTORNEY

May 2, 1961   G. F. D'ALELIO   2,982,457
TUBULAR STRUCTURES
Filed Nov. 28, 1958   3 Sheets-Sheet 3

INVENTOR.
GAETANO F. D'ALELIO
BY
Walter J. Monacelli
HIS ATTORNEY

United States Patent Office 2,982,457
Patented May 2, 1961

2,982,457
TUBULAR STRUCTURES

Gaetano F. D'Alelio, South Bend, Ind., assignor, by direct and mesne assignments, to Dal Mon Research Co., Cleveland, Ohio, a corporation of Delaware Filed Nov. 28, 1958, Ser. No. 777,004

17 Claims. (Cl. 229—3.5)

This invention relates to structures comprising laminates of metal and resin. More specifically, it relates to the manufacture of cans and other containers from laminated metal and resin.

Cans and various other containers requiring strength and imperviousness have been made from steel because of its relative cheapness when compared to other metals, such as aluminum, magnesium, copper, etc. Because of its tendency to corrode and to contaminate food in contact with its surfaces, steel containers have been coated with various materials to overcome these disadvantages. However, attempts to substitute aluminum and other light, less corrosive metals for such purposes have encountered the main disadvantage that the amount of such metals required to give a strength comparable to that obtained in steel containers involves a thickness and an amount of such light and more expensive metals that makes the cost prohibitive. Various designs proposed to avoid this disadvantage, including one in which the walls of an aluminum container are horizontally corrugated to give strength, have met with little, if any, commercial acceptance.

In accordance with the present invention, it has now been found that cans and other containers can be fabricated of very thin metal foil by a method adapted to simple processing techniques, with various modifications adapted to suit particular end uses of the product, using such small amounts of material as to make the cost commercially competitive with present containers while still meeting the strength requirements for such containers. In addition, the lighter weight of the containers made in accordance with this invention, as compared with present containers, permits a considerable saving in cost of handling and shipping. Even when steel foil is used in the practice of this invention, there is a considerable saving in the amount of metal used and in the weight of the container. Furthermore, the containers of this invention are adapted to fabrication at the site and simultaneously with or just prior to the filling of the container. These containers are also adapted to aseptic production, as well as aseptic filling of the containers.

The containers of this invention comprise a laminate of at least two layers of metal foil with a polymer film separating and adhering to the foil layers. The fabrication of such containers is adapted to various methods of assembly as described hereinafter. The assembled structure has at least two layers of metal foil and has a substantially continuous resin film separating and bonding the metal foil through substantially all of the circumference of the structure. The combination of layers gives a much greater strength and toughness than would be expected from the amounts of individual materials used. The structure can also have a polymer film on the inner surface of the assembled structure, or on both inner and outer surfaces.

In a preferred embodiment of the invention, the tubular portion of the containers comprises a single sheet of metal foil wrapped or convoluted in a plurality of layers around an axis which eventually will be the linear axis of the tubular portion of the assembled structure. By placing a polymer film on either or both sides of the metal foil, before it is wrapped, the successive layers of foil are separated by polymer film as the structure is assembled by wrapping on a mandrel which gives the desired shape and size to the assembled structure. During or subsequent to wrapping, adhesion of the polymer film to the metal foil is effected. Various methods of adhering the polymer to the foil can be used, such as are described hereinafter. Prior to the wrapping, the polymer film can be already adhered to one side of the foil, or can be unadhered on both sides, and then the unadhered side, or both unadhered sides of the film can be made to adhere to the metal foil in any convenient manner.

In the structures of this invention in which the various layers of metal foil constitute two or more inividual pieces of foil, it is essential that, in at least one layer and advantageously in all layers of foil, any edge of a metal foil running substantially linearly, or parallel to the linear axis of the container, be separated from a similar edge in an adjacent metal foil layer to which it is attached by at least 90° of the circumference, advantageously by at least 360°.

In the preferred embodiment of this invention where one continuous metal foil is used to supply the various layers of foil, this overlapping and adhesion is effected through at least 720°. It has been found necessary to have this minimum area of overlapping and adhesion between successive layers of foil in order to give the strength and sealing desired in such containers.

The structures of this invention can best be illustrated by reference to the drawings. In these drawings the thicknesses of the foils and films are exaggerated to show more clearly their arrangement, and the various other dimensions are obviously not according to scale. The protrusions caused by overlapping edges are also exaggerated and are not as noticeable in the actual structure.

Figure 1 shows the cross-section of a flat sheet of metal foil 1 and the cross-section of a polymer film 2 positioned on the underside of the foil. Areas A, B, and C represent the first, second, and third wraps of Figure 3.

Figure 2 corresponds to Figure 1, except that the foil 1 and the polymer film 2 are in reversed positions. End 3 is shown folded over doubly so that the foil edge is completely covered with polymer film.

Figure 3 shows a cross-section of an assembled tubular structure, taken in a plane perpendicular to its linear axis, fabricated by placing the end 3 of Figure 1 on a mandrel and wrapping the metal foil 1 and the polymer film 2 in the direction indicated by the arrow above the foil of Figure 1. In Figure 3 the inner surface of the tubular structure consists of metal foil and a laminate of three layers each of foil and film is shown. In this way the contents of a container made from this laminate as in Figure 4 will not come in contact with bare metal.

Figure 4 shows a cross-section of an assembled tubular structure taken as in Figure 2, fabricated by wrapping the foil and polymer film of Figure 2 in the direction indicated by the arrow above the film. The tubular structure of Figure 4 has the polymer film as the inner surface and metal foil as the outer surface. The laminate here consists of two layers each of foil and film. Details of turned end 3 are not shown in Figure 4.

Figure 5 shows a cross-section of a metal foil with polymer film on both surfaces of the foil.

Figure 6 shows a cross-section of a metal foil 1 with a continuous polymer film 2 on the under side of the foil and a polymer film 2" on the upper side only in a limited area.

Figure 7 shows a cross-section of an assembled tubular structure, also taken as in Figure 2, made by wrapping the foil and polymer film layers of Figure 5 in either direction. The structure of Figure 7 has a polymer film on both the inner and outer surfaces of the tubular structure.

Figure 8 shows a cross-section, taken as in Figure 2, of an assembled tubular structure made from the foil and polymer films of Figure 6, wrapped in the direction indicated by the arrow above Figure 6. The inner surface of the assembled tubular structure is the polymer film 2" which is on the upper limited area of the foil in Figure 7. Polymer film 2" can be thicker or thinner than polymer film 2 depending on the thickness desired on the inside of the container. Where it is desired to place a thicker polymer coating on the outside of the container than the thickness of polymer between metal layers, then film 2" will be correspondingly thicker than film 2. The polymer film 2 between the successive layers of metal foil in the assembled structure, as well as the polymer film layer on the outer surface of the assembled structure, is the polymer film 2 on the under side of the metal foil as shown in Fig. 7. Polymer film 2" can also be a different type of film from film 2 depending on the properties desired for their specific purposes.

Figure 9 shows a tubular structure assembled from two sheets of metal foil. The assembled structure has a polymer film on the inner surface and a polymer film between the two metal foil layers. The seams 5 of the two metal layers are 180° removed from each other.

Figure 13:
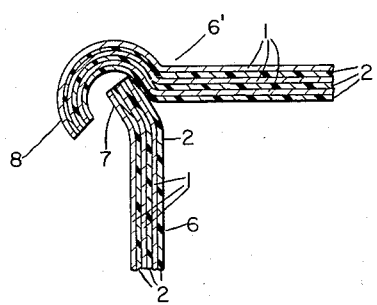

Figure 13 shows by cross-section the sealing of a can edge or end of the cylinder wall of a can with the bottom or cap of the can. This figure shows the relationship of the side wall 6 in an intermediate position with the flared end 7 meeting the bottom or top 6' in the curved section 8.

Figure 14:
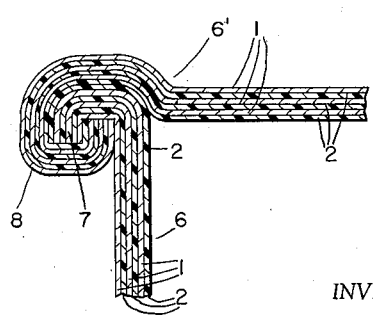

Figure 14 shows in cross-section the tightly sealed connection between the side wall 6 of a can and the bottom or cap 6' with the side wall end 7 being turned over and very tightly fixed between the turned portions of the bottom or cap now tightly pressed against the end 7. In all sections where the sides of 6 and 6' come together there is a polymer film forming a seal which avoids the necessity of using the sealing compound ordinarily required in making an impermeable seal in joining can or container bottoms and sidewalls. While, in this case, the inner surfaces of both the bottom and the side wall has a polymer coating, this same sealing effect is accomplished when only one of these two inner surfaces is thus coated. In either case, the seal is improved by heating which adheres the two polymer films or the polymer film to metal foil.

Figure 15:
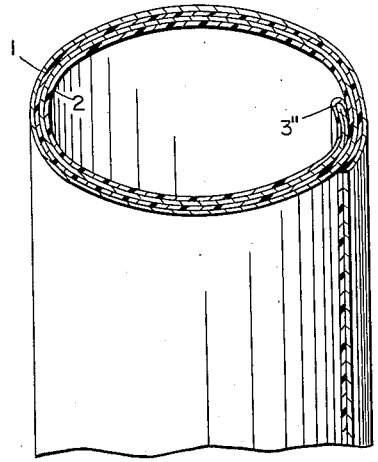

Figure 15 is a perspective view of the end of a tubular structure made with a polymer film forming the inner surface of the tubular structure and the metal foil forming the outer surface. End 3" shows a single fold to prevent contact of the metal foil edge with fluid material inside the structure.

Figure 16:
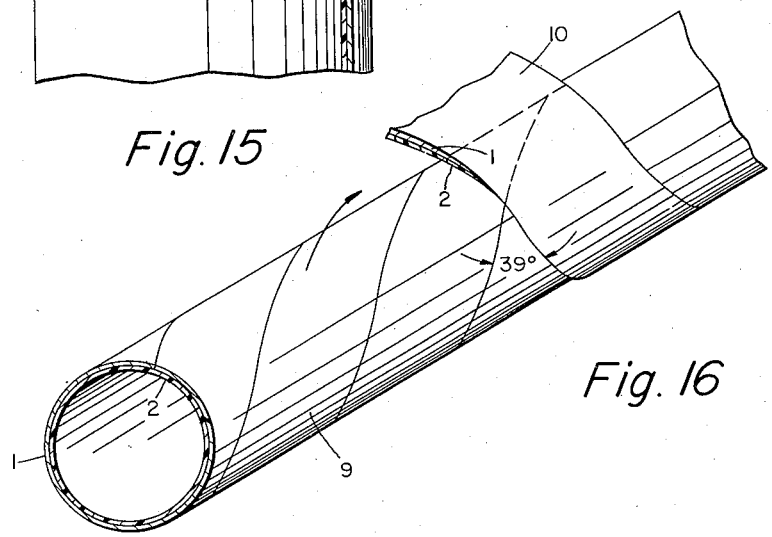

Figure 16 shows a tubular structure made by spirally winding a polymer-coated metal foil strip 9 in one direction around the longitudinal axis and then winding another polymer-coated metal foil strip 10 spirally around the longitudinal axis in the opposite direction.

Figure 17:
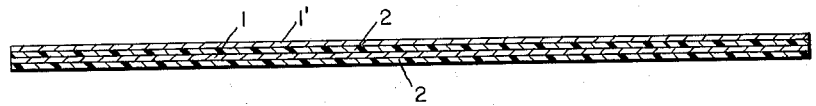

Figure 17 shows a laminate made of two layers of metal foil, one layer 1 being of one metal (aluminum, for example) and the other metal layer 1' being of a different metal (steel, for example) and the two layers 2 being of polymer film. Such a laminate can be assembled prior to wrapping or simultaneously with wrapping. This type of structure permits taking advantage of the properties of the different types of metal in the same structure.

Figure 18:
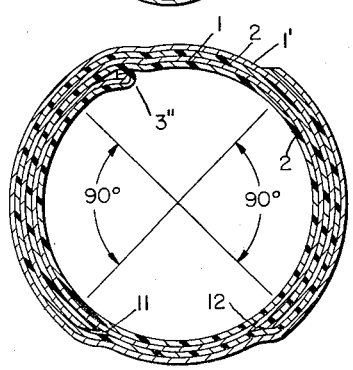

Figure 18 shows a cross-section of a container made by an inside wrap of aluminum coated with a polymer film on the side which forms the inside of the container and overlaps to point 11. At point 12 a second wrap is started of a metal foil of a different type, such as steel, coated with a polymer film which separates the two metal foils and prevents metal to metal contact.

In making the containers of this invention, various kinds of metal can be used depending on the properties desired in the container as well as the economics involved. For most practical purposes, aluminum, magnesium, steel, copper, bronze, and brass are advantageously used. The thickness of the metal foil can vary considerably depending on the size of the container and the particular properties desired. In some cases it may be desirable to build up a wall thickness of laminate of the very thinnest type of foil, and in other cases it may be desirable to use fewer layers of thicker foil, depending upon the particular properties desired in the product. Except with large diameter containers where extremely great wall strength is required, it is generally not necessary to have more than five thicknesses of metal foil to attain the wall strength desired in the containers and usually two or three thicknesses are sufficient. Foil thicknesses in the range of 0.0002 inch to 0.005 inch are used advantageously in the practice of this invention. However, in many cases even thinner foil, where available, or even thicker foil can be used for some purposes.

Various kinds of polymer film can be used in the practice of this invention. Since the adhesive properties of the various types of metals vary from one to the other, a polymeric material, including copolymeric materials, is selected which gives good adhesion with the particular metal being used. However, various methods of pretreating the metal and/or the polymer film can be used so that practically any of the polymer films available can be adhered to the various metals. The selection of the type of polymer is also determined by the material in the container with which it will come in contact, as well as the temperature conditions to which the container will be exposed. From an economic standpoint, the polymer film should be not much thicker than is required to give efficient adhesion between foil layers. Thicker polymer films are generally unnecessary and while they may not deleteriously affect the critical properties of the product, they increase the cost of materials. While even thinner films can often be used, it is generally advantageous to use films in the range of 0.00025 inch to 0.002 inch thickness, particularly for cans, cartons, bottles, and other small sized containers. Where economy is not an important factor, or films of the aforementioned thicknesses are not easily available, films of greater thickness can be used.

The films are preferably of high melting polymeric materials having molecular weights of at least about 10,000, advantageously of crystallizable or orientable polymers, since very thin films of such materials can be easily produced by bilateral stretching. However, the polymers need not be in an oriented or crystallized state when used in the practice of this invention, and in some cases are advantageously in an amorphous state for this purpose. Satisfactory polymers include low density polyethylene, high density polyethylene, polypropylene, nylon, polyesters, such as polyethylene polyterephthalate, glyceryl phthalate, polyvinyl acetate, etc., chlorosulfonated polyethylene, vinylidene chloride copolymers, polyvinyl chloride, vinyl chloride copolymers, polyvinylidene chloride, polymethylmethacrylate, etc. Mixtures of natural rubber and acrylonitrile butadiene low molecular weight copolymers, such as described in Patent No. 2,714,562, are also illustrative of the variety of polymeric materials that can be used.

Various methods of applying the polymer film can be used. A preformed film can be placed next to the metal foil as the foil is being wrapped into the container shape, with adhesion being effected simultaneously or subsequently to the wrapping step. Very often it is advantageous to apply the film to the foil prior to the wrapping step and to effect adhesion on one side of the polymer film. Then, simultaneously with or subsequent to the wrapping step, adhesion can be effected on the other side of the polymer film. In another variation, polymer film can be placed on both sides of the metal foil and adhered to the foil. In various other modifications, the resin film can be applied as a coating on the metal, for example, by spraying a resin solution, by melting or melt-spraying the resin, by applying a solution of the resin and evaporating the solvent, by completing polymerization of a partially polymerized resin after a thin layer of the partial polymer has been spread on the metal.

In a preferred embodiment of the invention, the metal foil and a layer of preformed film are placed in contact and adhered to each other. Then, the resultant polymer-coated foil is rolled and stored in that manner until ready for use, at which time the coated foil is wrapped onto a mandrel of the desired size and shape to form the tubular portion of the structure, and the adhesion of the remaining polymer film and metal foil surfaces is effected to give the rigid, tough, tubular portion of the structures of this invention. In cases where the metal is likely to become corroded, or to lose some of its adhesive properties, particularly where it has been chemically treated for that purpose, it is desirable to coat both sides of the metal foil with the polymer, and then to store the coated foil in roll form until the fabrication step is to be performed. Also, where printing is to appear on the outside of the container, this can be done by reverse printing on the metal-contacting side of the polymer film in the area which will form the outside of the container, either on a continuous coating or skip-coating of the polymer film, and the thus-coated foil rolled and stored until fabrication of the container. In such instances and in other cases where printing is to be between film and foil the ink is advantageously of a compatible material which will not interfere with the adhesion of the film to the foil.

The adhesion of the film to the metal can be effected by any appropriate method, which may vary according to the metal and polymer being used. The metal is advantageously cleaned of foreign substances by washing with solvent or degreasing agents, such as chlorinated solvents, hydrocarbons, etc. The surface can be chemically altered to improve adhesion by mild treatment with alkaline or acidic materials, such as solutions of sodium hydroxide, potassium hydroxide, sodium carbonate, sulfuric acid, oxalic acid, chromic acid, alkali metal oxalates, strontium hydroxide, etc. The polymer film can be improved in adhesive properties in many cases by surface oxidation, electric arc treatment, ozone treatment, and other controlled chemical reactions. The bonding of metal to polymer is effected advantageously by the application of heat and pressure, simultaneously with or subsequent to the wrapping operation. In a preferred embodiment the wrapping is effected on a heated mandrel, and when the desired thickness of laminate is reached the mandrel is super-cooled, advantageously by circulation of a cooling medium through the inside of the mandrel, and the tubular structure removed therefrom. Other methods of heating can also be used effectively, such as dielectric heating, heated rolls running over the laminate, radiation and light heating, electric heating, hot air, or gas heating, etc. Pressure can be exerted by rollers bearing on the laminate as it is being formed, by rotation of the mandrel during the wrapping operation in such a manner as to pull the foil tightly against it during the wrapping operation, by insertion in a mold subsequent to the wrapping step, etc.

The heating step described above is also advantageous in that it produces an aseptic can. By selection of the proper temperatures and by completing the filling of the can with food, also in an aseptic condition, and the end-sealing steps before aseptic conditions have disappeared, the need for post-treatment of the filled can for sterilizing purposes is avoided.

The wrapping operation can be performed by various techniques and using various types of equipment. The operation can consist of a simple wrapping, in which a rotating mandrel pulls the sheet of metal foil and the sheet of polymer film coming from the same or separate rolls, so that a cylindrical or convoluted laminate is accumulated on the mandrel in such a manner that the width of the sheets determines the ends of the resultant cylindrical laminate. In another embodiment, the films can be wrapped helically or spirally around the mandrel in various manners. For example, a metal foil having a resin film adhered to one side can be wrapped around a mandrel in a spiral path to give a cylindrical or other tubular shape corresponding to the shape of the mandrel. Then another layer can be wound around this first layer helically but in the opposite direction to the first helical winding and at an angle of 39° to the first winding. In this way, a number of layers can be built up in the laminate. In another, less preferred embodiment, the helical windings can be in the same direction around the mandrel but with edges overlapping. In another embodiment, the metal foil can be wrapped around spirally in one direction around the mandrel, and the polymer film can be wrapped spirally around the mandrel in the opposite direction, and by alternate layers a laminate built up to the desired thickness. If desired, such structures can be made in lengths sufficient for a number of containers and then cut to shorter lengths, and fabricated into cans or other containers by sealing the ends in various manners. In some cases, it is advantageous to score the metal foil so that the ultimate structure can be broken or opened along the scoring. In some cases, it is desirable to have a string, wire, cord, etc., rolled under the scoring line so that pulling of the string, etc., will serve to tear the metal foil along the scored line.

Figure 1:
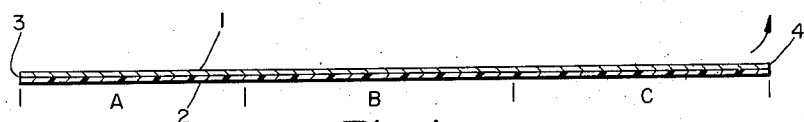
Figure 2:
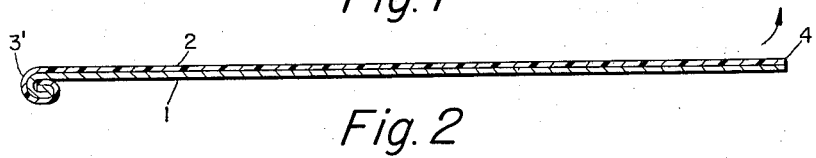

Labels, lettering, designs, etc., can be printed on the inner surface of that portion of the polymer film which will eventually form the outer coating of the container. By using reverse printing for this purpose, it is possible to have a label or other types of printing embodied in a protective covering on the outside of the container. Various methods of applying this technique are obvious. For example, printing can be applied on the polymer film surface which is in contact with the metal foil in that area C of Figure 1, which will be the "third wrap" or outer wrap, in such a way that the printing will appear on the outer surface of the tubular structure made by wrapping as indicated in Figures 1 and 2. Again, if reverse printing is placed on the inner surface of the film 2″ of Figure 7 in that area A, and the end 4 placed on a mandrel and wrapped in the direction opposite to that indicated for Figure 7, then a tubular structure will be obtained in which the printing appears on the outer foil surface of the container. Obviously, in such cases the polymer film should be transparent so that the printing will be visible through the film. The printing can also be placed directly on the metal foil, in the area which will form the outside of the container, although it is generally more difficult to print on metal. Also, where it is not desired to take advantage of the outside polymer film layer to protect the printing, the printing can be placed on the outside of the film layer either before or after fabrication.

While various techniques of adhering polymer film to the metal foil can be used in the practice of this invention, including various pretreatments of the foil and the film, as well as the use of various adhesives which have been used for the purpose of adhering polymers to metals, it is most surprising that a polymeric material, such as polyethylene, which is quite inert chemically and has not substituent groups therein which would impart adhesive properties, can be made to adhere to the metal foil in the practice of this invention by the simple application of heat. Temperatures used for such purposes can vary according to the period of exposure, and also in accordance with the thickness of the laminate. For example, a cylindrical laminate can be excellently adhered by exposure to 600° F. for 5 seconds. Therefore, the flexibility and simplicity of this technique makes it adaptable for various operating conditions.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

Figure 3:
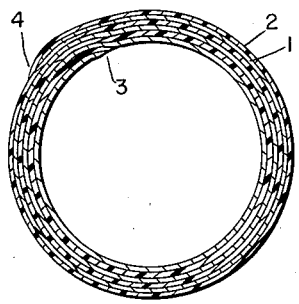

Low density polyethylene film having a width of 6 inches and an average thickness of 0.0002 inch, and aluminum foil having a cleaned surface and having a width of 6 inches and an average thickness of 0.0015 inch, are rolled together tightly on a hollow cylindrical mandrel having an outside diameter of 2 inches, made of polytetrafluoroethylene (sold on the market under the trademark "Teflon"), until a little more than two complete wraps of foil are in the cylindrical, laminated roll in the arrangement shown in Figure 3. The film and foil are cut at this point so that the laminated film and foil are separated from the remainder of the film and foil sheets. The cut edge, which runs parallel to the axis of the cylinder is fastened to the adjacent layer of the laminate by means of adhesive tape. The cylindrical laminate together with the mandrel is placed in a gas-heated oven maintained at an average temperature of 350° F. for a period of ten minutes. Then, the laminated product is removed from the oven and allowed to cool to room temperature before the mandrel is removed. The film and foil are excellently adhered to each other. A can is fabricated from this cylindrical laminate by sealing a cap of similar material to each end of the laminated tubular structure according to the technique shown in Figures 13 and 14. One cap is punctured in such a manner that a tube can be inserted and sealed to withstand pressure. The can is then tested for air pressure of 40 pounds without showing any signs of failure.

EXAMPLE II

Figure 4:
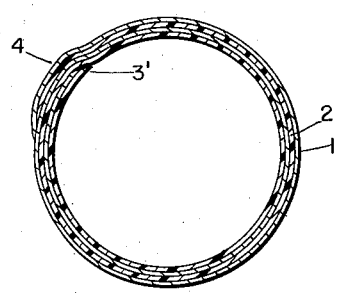

The procedure of Example I is repeated, reversing the respective positions of the film and foil so that the resultant laminated cylinder has a cross-section corresponding to that of Figure 4, and waxing the mandrel before wrapping so as to prevent adherence of the plastic film to the mandrel. After heating, as in Example I, the laminate is cooled to room temperature by passing cold water through the inside of the mandrel. Upon testing in a can structure, as in Example I, similar results are obtained.

EXAMPLE III

Figure 5:
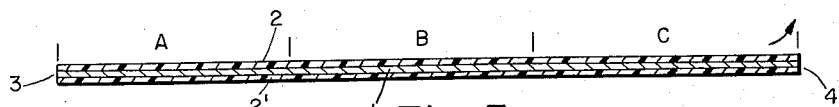
Figure 6:
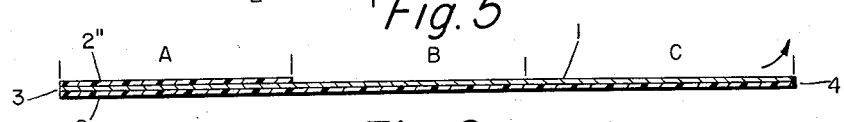
Figure 7:
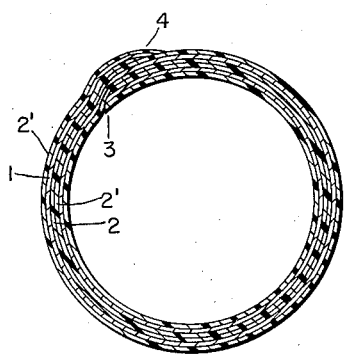

The procedure of Example II is repeated using aluminum foil covered on both sides by an adhered film of polyethylene, as in Figure 5, and in another case an adhered film of polyethylene on one side, as in Figure 6. The wrapping is as shown in Figure 7 and the product when tested, as in Example I, shows excellent results.

EXAMPLE IV

Figure 8:
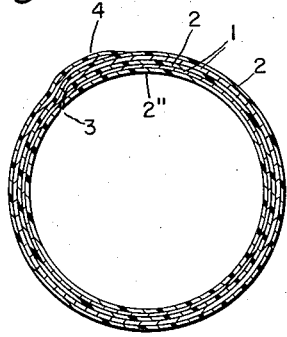
Figure 9:
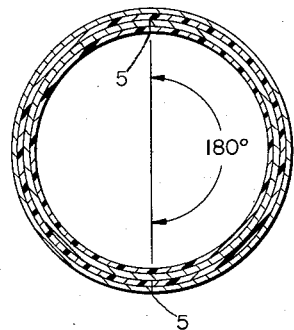
Figure 10:
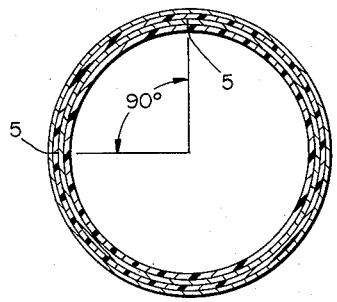
Figure 10 shows a structure similar to Figure 9, except that the seams of the two metal layers are separated by 90°. The metal foil layers of Figure 10, as well as those of Figure 9, can be of different metals and the edges in the same layer can be overlapping instead of abutting as shown.
Figure 11:
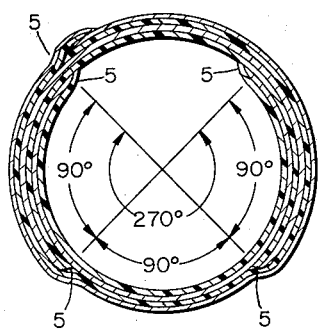
Figure 11 shows a cross-section of an assembled structure made from three sheets of metal foil, two of which sheets do not reach around the entire circumference of a cross-section. However, at any point on the circumference there are at least two thicknesses of metal foil and the seams on successive metal foil layers are at least 90° apart.
Figure 12:
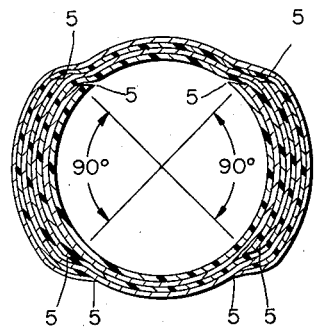
Figure 12 shows a cross-section of an assembled tubular structure made of four sheets of metal foil, none of which is long enough to cover the entire circumference of the cross-section of the structure, but at any point in the circumference, there are at least two thicknesses of metal foil and the sealing edges of successive layers of metal foil are at least 90° apart.

The procedure of Example II is repeated using aluminum foil coated on one side with polyethylene and partially coated on the other side with polyethylene, as in Figure 6. The wrapping is as shown in Figure 8 and when tested, as in Example I, shows excellent results.

EXAMPLE V

The procedure of Example I is repeated using various thicknesses of film, namely 0.005 inch, 0.001 inch, and 0.002 inch, respectively, with each of aluminum foil thicknesses of 0.002 inch, 0.005 inch, 0.001 inch, and 0.006 inch. In each case excellent adhesion is obtained, and similarly satisfactory results are obtained upon testing as in Example I.

EXAMPLE VI

The procedure of Example II is repeated except that the mandrel is a hollow steel mandrel of similar size coated on the outer side by one layer of a butt-jointed, spirally wrapped adhering Teflon tape of 0.010 inch thickness and the cylindrical laminate is heated by high frequency electrical induction heating at 600° F. for a period of 2 seconds. Upon removal from the oven, cooling to room temperature, and removing the mandrel from the laminate, the film and foil are found to be excellently adhered to each other, and upon testing as in Example I, excellent results are obtained.

The foregoing procedure is repeated a number of times, varying the temperature and time as follows: 400° F. for 5 minutes; 450° F. for 2 minutes; 500° F. for 30 seconds; and 550° F. for 15 seconds. In each case the product is satisfactorily adhered.

The foregoing procedures are repeated using electrical inductance to generate the temperature desired. In each case, upon exposure to the various temperatures for the corresponding periods, similar excellent results are obtained.

EXAMPLE VII

The procedure of Example VI is repeated, using a sheet of aluminum foil on which a film of polyvinyl acetate has been placed by coating with a solution of 28% by weight of polyvinyl acetate in methyl acetate and allowing to dry so as to give a polymer coating of 0.001 inch thickness. After the coated foil is wrapped, the cylindrical laminated product is heated in a gas-fired oven at a temperature of 400° F. for 10 minutes. Upon removal from the oven, cooling to room temperature, and removal from the mandrel, the laminated product shows excellent adhesion between foil layers. A can fabricated and tested, as in Example I, shows excellent results.

EXAMPLE VIII

The procedure of Example VI is repeated using a sheet of aluminum foil on which a film of polymeric glyceryl phthalate resin has been placed, by coating with a solution of 28% by weight of resin in methyl acetate, and allowing to dry so as to give a polymer coating of 0.001 inch thickness. After the coated foil is wrapped, the cylindrical laminated product is heated in a gas-fired oven at a temperature of 400° F. for 10 minutes. Upon removal from the oven and cooling to room temperature, the laminated product shows excellent adhesion between foil layers. A can fabricated and tested, as in Example I, shows excellent properties.

EXAMPLE IX

The procedure of Example II is repeated using the film and foil thicknesses indicated therein, but using appropriate lengths of film to give the wrappings shown in Figures 9, 10, 11 and 12, respectively, and holding down the edges of the successive layers of foil and film with adhesive tape. Upon testing, as in Example I, satisfactory results are obtained.

EXAMPLE X

The procedure of Example I is repeated except that wrapping is done spirally, as in Figure 16, using a mandrel two feet in length and three inches in diameter, and sufficient lengths of film and foil are used to cover the entire length of the mandrel. As indicated in Figure 16, the first winding of foil-film laminate is made clockwise around the mandrel, and the second laminate layer is wound counterclockwise with an angle of 39 degrees between the spiral edges of the two layers of laminate. The resultant tubular structure is cut into 6 inch lengths, fabricated into cans, and tested, as in Example I, with good results.

EXAMPLE XI

A laminate having the arrangement shown in Figure 6 is prepared with a skip-coating of polyethylene in the area indicated at 2′ in Figure 6, and a continuous coating on the opposite side made from a solution containing 400 parts ethyl alcohol, 50 parts ethyl acetate, 25 parts nitrocellulose of a one-half second viscosity grade containing approximately 11% nitrogen, 25 parts butyl ricinoleate, and 100 parts polyvinyl butyral. The polyvinyl butyral is made from a polyvinyl acetate of such a viscosity that a 7.5% solution by weight in methanol of the polyvinyl butyral has a viscosity of 160 centipoises at 20° C., and has 17–20% by weight of hydroxyl groups calculated as polyvinyl alcohol, less than 3% acetate groups calculated as polyvinyl acetate, and the balance substantially butyraldehyde acetal. A solution is prepared by allowing the nitrocellulose to soak in the ethyl alcohol until well softened and then the ethyl acetate is added with stirring and heating until the nitrocellulose is completely dissolved. The butyl ricinoleate is then added to the solution and then with rapid stirrinng the polyvinyl butyral, in finely divided form, is quickly added. Stirring is continued until the solution becomes very viscous, following which the solution is allowed to stand at 50–60° C., until solution has been completed and air bubbles have been allowed to escape. The solution is applied to the aluminum foil by means of a doctor blade to give a coating of approximately 0.0015 inch thickness after drying. The coated foil is allowed to dry until tack free and then the coated foil is placed in the dryer at 80° C. to remove the remaining solvent. The laminate is wrapped around a waxed mandrel, according to the arrangement shown in Figure 8, and heated to 350° F. for one minute. Upon completing the can structure and testing, as in Example I, excellent results are obtained.

EXAMPLE XII

The procedure of Example II is repeated three times, using film of 0.0002 inch, 0.0003 inch, and 0.0004 inch, respectively, of the modified polyterephthalate film sold under the trademark "Videne." Upon testing as in Example I, each of the products gives excellent results.

EXAMPLE XIII

Certain of the foregoing procedures are repeated as indicated in the table below using the foils and polymer films indicated. In each case very good results are obtained upon testing as in Example I.

Table

| Foil | | Polymer Film | | Procedure used as in Example |
|---|---|---|---|---|
| Type | Thickness, Inch | Type | Thickness, Inch | |
| Aluminum | 0.002 | Polyethylene-polyterephthalate. | 0.0005 | I |
| Do | 0.0005 | Hydrogenated polybutadiene. | 0.0002 | I |
| Do | 0.001 | High density polyethylene [1] | 0.0005 | II |
| Do | 0.001 | Chlorosulfonated polyethylene. | 0.001 | I |
| Do | 0.0015 | Polyvinyl chloride. | 0.001 | I |
| Copper | 0.00135 | Polyethylene | 0.0002 | I |
| Do | 0.0027 | Hydrogenated polybutadiene | 0.0002 | II |
| Do | 0.0027 | Polyethylene polyterephthalate. | 0.00035 | II |
| Do | 0.0027 | Polypropylene | 0.0005 | II |
| Do | 0.004 | Polyvinyl acetate | 0.001 | VII |
| Stainless steel | 0.001 | Polyethylene | 0.0002 | I |
| Carbon steel | 0.001 | do | 0.001 | I |
| Do | 0.002 | Polyethylene polyterephthalate. | 0.002 | I |
| Do | 0.002 | Polyvinyl acetate | 0.005 | VII |
| Do | 0.002 | Polyethylene | 0.0002 | III |
| Stainless steel | 0.0002 | Polyvinyl chloride. | 0.002 | I |
| Magnesium | 0.004 | Polyethylene | 0.001 | I |
| Bronze | 0.002 | do | 0.0002 | I |
| Brass | 0.002 | Polyethylene polyterephthalate. | 0.0005 | I |
| Magnesium | 0.004 | Polyvinyl acetate | 0.001 | I |

[1] To which 3% acrylic acid has been grafted by irradiation.

EXAMPLE XIV

Five cans are made according to the procedure of Example II and the ends are sealed with caps made from a laminate as shown in Fig. 17, made of aluminum foil of 0.002 inch thickness for layer 1 and tin plated steel having an overall thickness of 0.010 inch, with modified polyethylene polyterephthalate film ("Videne" film) of 0.0002 inch thickness for layers 2. Before the second end is capped in each case, the cans are filled with beer and then capped. The cans are then heated to 140° F. for 8 minutes in a pasteurization unit which develops 85 pounds per square inch internal pressure in the cans. The cans show no signs of bulging in the sidewalls and the ends show only very slightly more bulging than is present in the steel beer cans presently on the market. These cans are stored for six months, and upon opening the beer is found to have excellent taste, and the can structure is found to be in excellent condition.

EXAMPLE XV

Five cans are made according to the procedure of Example XIV and capped without filling. One end is pierced in each can, fitted with a tube to give a gas-tight seal, and put under air pressure up to 175 pounds per square inch. In each case the can shows as good resistance to bulging as in Example XIV.

EXAMPLE XVI

A number of cans are made according to the procedure of Example I, and removed from the mandrels while the tubular structures and the mandrels are still at aseptically high temperature. Then each tubular structure is sealed at one end with a cap of similar laminated material consisting of two foil and two film layers with film on the inside surface of the cap, according to the technique shown in Figures 13 and 14, and the can and additional caps are placed again in the oven and maintained at a temperature of 300° F. for a period of five minutes. Then, the cans are filled immediately with food in an aseptic condition and immediately sealed with the aseptic caps before the aseptic conditions are dissipated. The foods are, respectively, beans, peas, corn, tomatoes, and Brussels sprouts. After six months the cans are opened and the contents are found to be in excellent condition and taste.

In shaping container structures which have a polymer film on the inside of the container or on that side of the laminate which will come in contact with the mandrel, it is desirable to have the mandrel coated or made of material which will not adhere to the film under the conditions used in the shaping process. Various release materials can be used for this purpose. In addition to the polytetrafluoroethylene illustrated in the examples above, various other materials, such as silicones, e.g. Dow silicone R-671, silicone rubber, cellulose acetate, cellophane, Kel-F, etc., can be used. The choice of release material will be determined according to the polymer and the temperature conditions to be used. In most cases polytetrafluoroethylene, for example that sold under the trademark "Teflon," has been satisfactory with various polymers and the various temperatures used.

In addition to the various methods described above, the metal foil and polymer film can be joined in a variety of other methods. For example, the film and foil can come from separate rolls and heat can be applied as the two are wrapped around the mandrel. In another case, the foil can be preheated, possibly super-heated so as to supply all the heat required for the adhering operation.

In another modification, a layer of polymer in powder form can be spread on a moving belt of foil to a desired thickness determined by a doctor blade, and the powder melted by heated rolls over which the foil is passed, or by other means.

In another modification, the polymer powder can be sprayed on heated foil and the thickness of the polymer film determined by the spacing of a roller that presses against the mandrel as it is rotated. In this case, the position of the roller is automatically adjusted in accordance with the number of layers accumulated on the mandrel so as to give a uniform thickness of polymer between metal layers.

In another modification, polymer, such as polyethylene, in powder form can be maintained in a fluidized state with nitrogen in a chamber through which hot metal foil is passed so as to accumulate a coating of fused or melted polymer, and thereafter processed and fabricated to give the tubular structures.

In addition to the type of can sealing means indicated above, other means can be used for such purpose, such as, for example, crimping, or tying and pressing between plates, one inside and one outside the container structure to make the end-seal as compact as possible. In other cases, one end can be sealed in one manner or another and the top of the container tapered in a shape similar to a bottle and a cap of the pressure or screw-on types, such as applied to bottles, affixed to the top end. In other cases, top and bottom can be flat as in ordinary can structures, with an opening in the upper capping end which can be covered by an adhering plastic polymer film for easy opening and resealing.

In addition to the circular cross-section shown hereinabove, the containers and tubular structures can have various other cross-sections, such as, square, rectangular, triangular, hexagonal, etc. Furthermore, the tubular structures can be pressed in molds by exerting pressure from the inside of the structure, such as with an expansible mandrel operating while the container is within a confining mold form, so as to give various shapes to the structures, for example, various bottle shapes, etc.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process of manufacturing a moisture proof container adapted to contain liquids and also adapted to withstand internal pressures of at least 40 pounds per square inch comprising the step of preparing a tubular portion of said container by convolutely wrapping a single sheet of metal foil and a sheet of a polymer film which at normal temperatures is non-adhering to said foil and selected from the class consisting of polymeric ethylene terephthalate, nylon, hydrogenated polybutadiene, chlorosulfonated polyethylene and polymers of ethylene, propylene, vinyl acetate, vinylidene chloride, vinyl chloride, and methyl methacrylate about a mandrel in such a manner that said polymer film separates each layer of said metal foil, heating said convoluted foil and film to a temperature at which said film is adhered to each adjacent layer of metal foil, and subsequently applying an end-sealing means.

2. A process of claim 1 in which said metal foil is aluminum.

3. A process of claim 2 in which said polymer film is polyethylene.

4. A process of claim 2 in which said polymer film is a polymeric ethylene terephthalate.

5. A process of claim 2 in which said polymer film is polyvinyl acetate.

6. A process of claim 2 in which said polymer film is hydrogenated polybutadiene.

7. A process of claim 1 in which said convoluted foil is heated to a temperature of at least 400° F.

8. A process of claim 1 in which said end-sealing means is a flat, laminated sheet similar in composition to that of said convoluted tubular portion with the sealing effected by turning the corresponding edge of said flat, laminated sheet over with a flared-out end portion of said tubular wall so as to form a tight seal between said flat, laminated sheet and said tubular wall section.

9. A moisture-proof container adapted to contain liquids therein and also adapted to withstand internal pressures of at least 40 pounds per square inch, comprising a convoluted laminate consisting of a single continuous sheet of metal foil convolutely wrapped to at least 2 convolutions about and spaced from the linear axis of said container, each of said metal foil convolutions being separated from adjacent metal foil convolutions only by an adhering polymer film, said polymer film being adhered to each metal foil layer adjacent thereto, and said polymer film being one which normally is non-adherent to said metal foil at room temperature but which has been made adherent by heating said convoluted laminate at a temperature at which said film becomes adherent and being selected from the class consisting of polymeric ethylene terephthalate, nylon, hydrogenated polybutadiene, chlorosulfonated polyethylene and polymers of ethylene, propylene, vinyl acetate, vinylidene chloride, vinyl chloride, and methyl methacrylate.

10. A container of claim 9 in which the number of convolutions of polymer film is no more than about one more than the number of convolutions of metal foil.

11. A container of claim 9 in which the number of convolutions of metal foil does not substantially exceed three complete convolutions.

12. A container of claim 11 in which the number of convolutions of said polymer film is no greater than about one more than the number of such metal foil convolutions.

13. A container of claim 9 in which said metal foil is aluminum.

14. A container of claim 13 in which said polymer film is polyethylene.

15. A container of claim 13 in which said polymer film is polymeric ethylene terephthalate.

16. A container of claim 13 in which said polymer film is polyvinyl acetate.

17. A container of claim 13 in which said polymer film is hydrogenated polybutadiene.

References Cited in the file of this patent

UNITED STATES PATENTS

| | | |
|---|---|---|
| 2,056,956 | Carpenter | Oct. 13, 1936 |
| 2,124,231 | Kittredge et al. | July 19, 1938 |
| 2,230,987 | Karl | Feb. 4, 1941 |
| 2,461,539 | Fletcher | Feb. 15, 1949 |
| 2,568,664 | Scott | Sept. 18, 1951 |
| 2,830,001 | Barnes et al. | Apr. 8, 1958 |
| 2,838,437 | Busse et al. | June 10, 1958 |
| 2,861,022 | Lundsager | Nov. 18, 1958 |
| 2,914,091 | Barnes et al. | Nov. 24, 1959 |

FOREIGN PATENTS

| | | |
|---|---|---|
| 105,330 | Sweden | Aug. 25, 1942 |
| 831,460 | France | June 7, 1938 |